(12) United States Patent
Isono (10) Patent No.: US 10,508,725 B2
(45) Date of Patent: Dec. 17, 2019

(54) GEARED TRANSMISSION UNIT (71) Applicant: TOYOTA JIDOSHA KABUSHIKI KAISHA, Toyota-shi, Aichi (JP)

(72) Inventor: Hiroshi Isono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 15/964,757

(22) Filed: Apr. 27, 2018

(65) Prior Publication Data
US 2018/0335117 A1 Nov. 22, 2018

(30) Foreign Application Priority Data

May 19, 2017 (JP) ................. 2017-099709

(51) Int. Cl.
*F16H 37/06* (2006.01)
*F16H 37/08* (2006.01)
*F16H 25/20* (2006.01)

(52) U.S. Cl.
CPC ....... *F16H 37/065* (2013.01); *F16H 37/0826* (2013.01); *F16H 37/0833* (2013.01); *F16H 2025/2075* (2013.01); *F16H 2025/2087* (2013.01)

(58) Field of Classification Search
CPC ............... F16H 37/065; F16H 37/0833; F16H 37/0826; F16H 2025/2075
See application file for complete search history.

(56) References Cited

U.S. PATENT DOCUMENTS

| | | | |
|---|---|---|---|
| 4,080,847 A * | 3/1978 | Thomas | F16H 3/74 475/254 |
| 4,932,928 A * | 6/1990 | Crockett | F16H 47/085 475/47 |
| 2004/0055404 A1 * | 3/2004 | Mills | F16H 61/32 74/337.5 |

FOREIGN PATENT DOCUMENTS

| | | |
|---|---|---|
| JP | S60-95250 U | 6/1985 |
| JP | 2010-060095 A | 3/2010 |
| JP | 2011-127726 A | 6/2011 |
| JP | 2014-80154 A | 5/2014 |

* cited by examiner

Primary Examiner — Mark J Beauchaine
(74) Attorney, Agent, or Firm — Oliff PLC (57) ABSTRACT

A geared transmission unit in which flexibility in arrangements of shafts and members coupled to the shafts is enhanced. The geared transmission unit comprises: a pair of pinion gears having different teeth numbers that rotate integrally; a carrier that rotates while supporting the pinion gears in a rotatable manner; a fixed gear meshed with a first pinion gear; a first transmission gear arranged on an inner circumferential side of the carrier while being meshed with a second pinion gear; an external gear formed on an outer circumferential face of the carrier; and second transmission gears respectively meshing with the external gear.

16 Claims, 6 Drawing Sheets

GEARED TRANSMISSION UNIT

CROSS REFERENCE TO RELATED APPLICATION

The present invention claims the benefit of Japanese Patent Application No. 2017-099709 filed on May 19, 2017, with the Japanese Patent Office.

BACKGROUND

Field of the Disclosure

Embodiments of the present disclosure relate to the art of a geared transmission unit for transmitting power through a planetary gear set.

Discussion of the Related Art

An example of this kind of transmission is described in JP-A-2010-60095. The planetary gear unit taught by JP-A-2010-60095 comprises two stepped pinion gears and a carrier that supports the stepped pinion gears in a rotatable manner and that is connected to a motor. The stepped pinion gears are arranged at equal intervals on the carrier, and each of the stepped pinion gears includes a fixed planetary gear and an output planetary gear. The output planetary gear is diametrically smaller than the fixed planetary gear. The planetary gear unit taught by JP-A-2010-60095 further comprises a fixed gear fixed to a stationary member coaxially with the carrier, and an output gear coupled to an output shaft. The fixed gear is diametrically larger than the fixed planetary gear, and meshed with the fixed planetary gear. The output gear is diametrically larger than the output planetary gear, and meshed with the output planetary gear. When the carrier is rotated by a torque of the motor, the fixed planetary gear meshing with the fixed gear rotates around the fixed gear at a speed governed by a gear ratio between the fixed planetary gear and the fixed gear. Consequently, an output shaft integrated with the output gear meshing with the output planetary gear is rotated at a speed governed by a gear ratio between the output planetary gear and the output gear as well as a rotational speed and a revolving speed of the output planetary gear. That is, a speed ratio of the planetary gear unit taught by JP-A-2010-60095 as a ratio of the speed of the motor to the speed of the output shaft is governed by the gear ratio between the fixed planetary gear and the fixed gear and the gear ratio between the output planetary gear and the output gear. In the planetary gear unit taught by JP-A-2010-60095, therefore, the torque of the motor is multiplied according to the above-explained speed ratio and outputted from the output shaft.

Thus, in the planetary gear unit taught by JP-A-2010-60095, the output planetary gear revolves around the output gear coupled to the output shaft to rotate the output gear, and the rotational speed of the output planetary gear is reduced by the fixed gear and the fixed planetary gear meshing with the fixed gear. Therefore, the planetary gear unit taught by JP-A-2010-60095 as a speed reducing device may increase a speed reducing ratio. In the planetary gear unit taught by JP-A-2010-60095, however, the input shaft coupled to the carrier and the output shaft coupled to the fixed gear are arranged coaxially. For this reason, there may be a restriction on arrangements of an input mechanism and an output mechanism to be fitted into a vehicle. In addition, since the gears governing the speed ratio are arranged in an inner circumferential side of the carrier, sizes and numbers of teeth of the gears may be restricted. For this reason, it may be difficult to further increase the speed ratio or the speed reducing ratio in the planetary gear unit taught by JP-A-2010-60095.

SUMMARY

Aspects of embodiments of the present disclosure have been conceived noting the foregoing technical problems, and it is therefore an object of embodiments of the present disclosure is to provide a geared transmission unit in which flexibility in arrangements of shafts, and flexibility in design and size of members coupled to the shafts are enhanced.

The embodiment of the present disclosure relates to a geared transmission unit that transmits torque through a plurality of gears. In order to achieve the above-explained objective, according to the embodiment of the present disclosure, the geared transmission unit is provided with: at least one pair of pinion gears having different teeth numbers that are disposed coaxially to rotate integrally; a carrier that rotates while supporting the pair of pinion gears in such a manner that the pinion gears are rotated and revolved; a fixed gear that is fixed to a predetermined stationary member while being meshed with a first pinion gear of the pair of pinion gears; a first transmission gear that is arranged on an inner circumferential side of the carrier and coaxially with the carrier while being meshed with a second pinion gear of the pair of pinion gears; an external gear that is formed on an outer circumferential face of the carrier; and a plurality of second transmission gears respectively meshing with the external gear.

In a non-limiting embodiment, the first transmission gear and the second transmission gear may be arranged in such a manner that rotational center axes of the first transmission gear and the second transmission gear extend parallel to a rotational center axis of the carrier. The geared transmission unit may further comprise a driven member coupled to the first transmission gear, and a plurality of actuators individually coupled to the second transmission gears. In addition, the driven member and the actuators may be arranged on the same side of the geared transmission unit in an axial direction.

In a non-limiting embodiment, the teeth number of the first pinion gear may be smaller than the teeth number of the second pinion gear.

In a non-limiting embodiment, the fixed gear may include a sun gear arranged on an inner circumferential side of the first pinion gear.

In a non-limiting embodiment, the fixed gear may include a ring gear arranged on an outer circumferential side of the first pinion gear.

In a non-limiting embodiment, the driven member may include an output member to which a torque is delivered from the first transmission gear, and the actuator may include a motor that applies a torque to the second transmission gear.

In the gear transmission unit according to the embodiment of the present disclosure, when a torque is applied to each of the second transmission gears, the carrier having the external gear is rotated by the rotations of the second transmission gears. Consequently, the first pinion gear meshing with the fixed gear is rotated and revolved integrally with the second pinion gear. As a result, the first transmission gear is rotated by the rotation of the second pinion gear at a predetermined speed. In the geared transmission unit according to the embodiments of the present disclosure, the second transmission gear and the external gear meshing with the second transmission gear are arranged on the outer circumferential side of the carrier. In the geared transmission unit, therefore, outer diameters and teeth numbers of the second transmission gear and the external gear are not restricted by an inner diameter of the carrier. For this reason, a speed ratio of the geared transmission unit can be increased in comparison with the conventional transmission units. In other words, a range of the speed ratio can be widened.

In addition, in the geared transmission unit according to the embodiments of the present disclosure, and the actuators and the output member are arranged on the same side in the axial direction. According to the embodiments of the present disclosure, therefore, flexibility of arrangement of the actuators etc. may be enhanced. For this reason, the geared transmission unit may be fitted easily into a vehicle.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

First Embodiment

Figure 1:
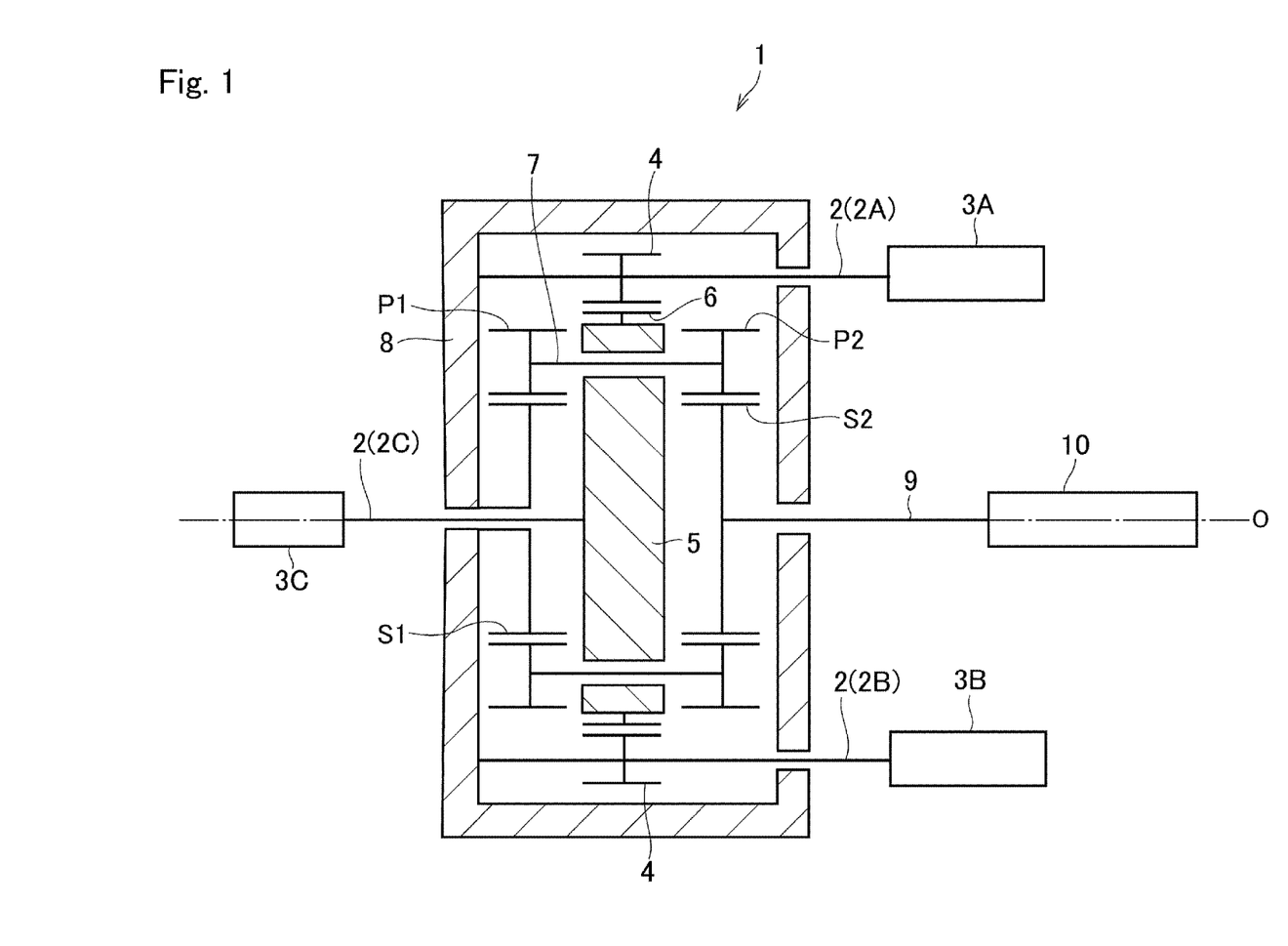
FIG. 1 is a cross-sectional view schematically showing a first embodiment of the geared transmission unit.

Preferred embodiments of the present disclosure will now be explained with reference to the accompanying drawings. Referring now to FIG. 1, there is shown the first embodiment of the geared transmission unit 1 according to the present disclosure. The geared transmission unit 1 shown in FIG. 1 is adapted to serve as a speed reducing device. The geared transmission unit 1 is provided with three input shafts 2 including a first input shaft 2A and a second input shaft 2B extending parallel to each other across a rotational center axis O of the geared transmission unit 1 while protruding in one direction, and a third input shaft 2C protruding in the opposite direction along the rotational center axis O. The first input shaft 2A is coupled to a first actuator 3A, the second input shaft 2B is coupled to a second actuator 3B, and the third input shaft 2C is coupled to a third actuator 3C. In the embodiments, each of the actuator 3A, 3B, and 3C individually serves as an input device. A drive gear 4 as an external gear serving as a second transmission gear is individually mounted on the first input shaft 2A and the second input shaft 2B. A carrier 5 that supports a plurality of pinion gears in a rotatable manner is coupled to the third input shaft 2C in an opposite side of the third actuator 3C.

The carrier 5 is a flat plate member, and an external gear 6 that is diametrically larger than the drive gear 4 is formed on an outer circumferential face of the carrier 5 to be meshed with the drive gears 4. Thus, the first input shaft 2A and the second input shaft 2B are situated radially outer side of the third input shaft 2C. A first pinion shaft 7 extends parallel to the rotational center axis O while penetrating through a radially outer portion of the carrier 5, and a first pinion gear P1 and a second pinion gear P2 are supported by the first pinion shaft 7 in such a manner as to rotate integrally.

In the first embodiment, for example, the likes of an electromagnetic brake that stops the rotation of each of the drive gears 4 due to a magnetic attraction force generated by passage of an electric current may be adopted as the first actuator 3A and the second actuator 3B respectively. Instead, an electric brake that generates a frictional braking force using a feed screw mechanism driven by an electric motor, and a regenerative brake that stops the rotation of each of the drive gears 4 utilizing a resistance force generated when generating electricity by a motor, may also be adopted as the first actuator 3A and the second actuator 3B respectively. On the other hand, the likes of a permanent magnet type synchronous motor or an induction motor, for example, may be adopted as the third actuator 3C to generate a drive torque.

A first sun gear S1 as an external gear that is diametrically larger than the first pinion gear P1 meshes with the first pinion gear P1. The first sun gear S1 serving as a fixed gear of the embodiments is arranged coaxially with the carrier 5 while being fixed to a stationary member such as a casing 8. The second pinion gear P2 meshes with a second sun gear S2 as a first transmission gear that is diametrically larger than the second pinion gear P2. The second sun gear S2 is also arranged coaxially with the carrier 5 while being coupled to the output shaft 9. That is, the second sun gear S2 is arranged in an opposite side of the first sun gear across the carrier 5. Thus, the output shaft 9 is arranged on the same side as the first actuator 3A and the second actuator 3B, and the output shaft 9 is coupled to an output member 10 such as a wheel of a vehicle. Accordingly, the output member 10 serves as a driven member of the embodiments.

Here will be explained an action of the geared transmission unit 1 according to the first embodiment. When the third input shaft 2C and the carrier 5 are rotated by a torque of the third actuator 3C, the first pinion gear P1 revolves around the fixed first sun gear S1 while rotating due to the rotation of the carrier 5. In this situation, the second pinion gear P2 is rotated integrally with the first pinion gear P1 at the same speed in the same direction. Consequently, the second sun gear S2 meshing with the second pinion gear P2 and the output shaft 9 coupled to the second sun gear S2 are rotated by the rotation of the second pinion gear P2. Specifically, the second sun gear S2 and the output shaft 9 are rotated at a speed governed by a gear ratio between the second pinion gear P2 and the second sun gear S2, and a rotational speed and a revolving speed of the second pinion gear P2. Meanwhile, both of the drive gears 4 are rotated by a torque of the external gear 6, and the first actuator 3A and the second actuator 3B are rotated by torques of the drive gears 4. In this situation, a torque of the third actuator 3C may be translated into electricity at least partially by at least any one of the first actuator 3A and the second actuator 3B. Alternatively, the first actuator 3A and the second actuator 3B may also be allowed to rotate freely without establishing a brake torque.

A speed ratio between the carrier 5 and the second sun gear S2 in the geared transmission unit 1 according to the first embodiment, that is, an output speed $N_{out}$ of the second sun gear S2 in the geared transmission unit 1 according to the first embodiment can be expressed by the following expression (1):

$$N_{out} = N_{IN} \cdot (1 - (ZS1/ZP1) \cdot (ZP2/ZS2)) \quad (1)$$

where $N_{IN}$ is a speed of the carrier 5, ZS1 is the teeth number of the first sun gear S1, ZP1 is the teeth number of the first pinion gear P1, ZP2 is the teeth number of the second pinion gear P2, and ZS2 is the teeth number of the second sun gear S2. Specifically, the teeth numbers of the first sun gear S1, the second sun gear S2, the first pinion gear P1, and the second pinion gear P2 are set in such a manner that an absolute value of the output speed $N_{out}$ of the second sun gear S2 is reduced smaller than "1". In addition, the teeth number ZP1 of the first pinion gear P1 may be smaller than the teeth number ZP2 of the second pinion gear P2.

Thus, in the geared transmission unit 1 according to the first embodiment, the torque of the third actuator 3C is transmitted to the output shaft 9 while being multiplied. Therefore, a smaller actuator whose capacity is smaller may be adopted as the third actuator 3C. The rotational speeds of the first actuator 3A and the second actuator 3B are increased in comparison with the carrier 5 in accordance with the gear ratio between the drive gear 4 and the external gear 6. That is, the torque of the carrier 5 to be distributed to the first actuator 3A and the second actuator 3B is reduced in accordance with the gear ratio between the drive gear 4 and the external gear 6. Therefore, required brake torques of the first actuator 3A and the second actuator 3B to reduce the speed of the output member 10 or to stop the rotation of the output member 10 can be reduced. Moreover, since the first actuator 3A and the second actuator 3B are arranged in the geared transmission unit 1, loads on each of the first actuator 3A and the second actuator 3B can be reduced. Therefore, the first actuator 3A and the second actuator 3B may also be downsized. Further, since the first actuator 3A and the second actuator 3B are arranged in radially outer sides of the third actuator 3C, flexibility of arrangement of the first actuator 3A, the second actuator 3B, and the third actuator 3C can be increased. For these reasons, the geared transmission unit 1 can be downsized.

Second Embodiment

Figure 2:
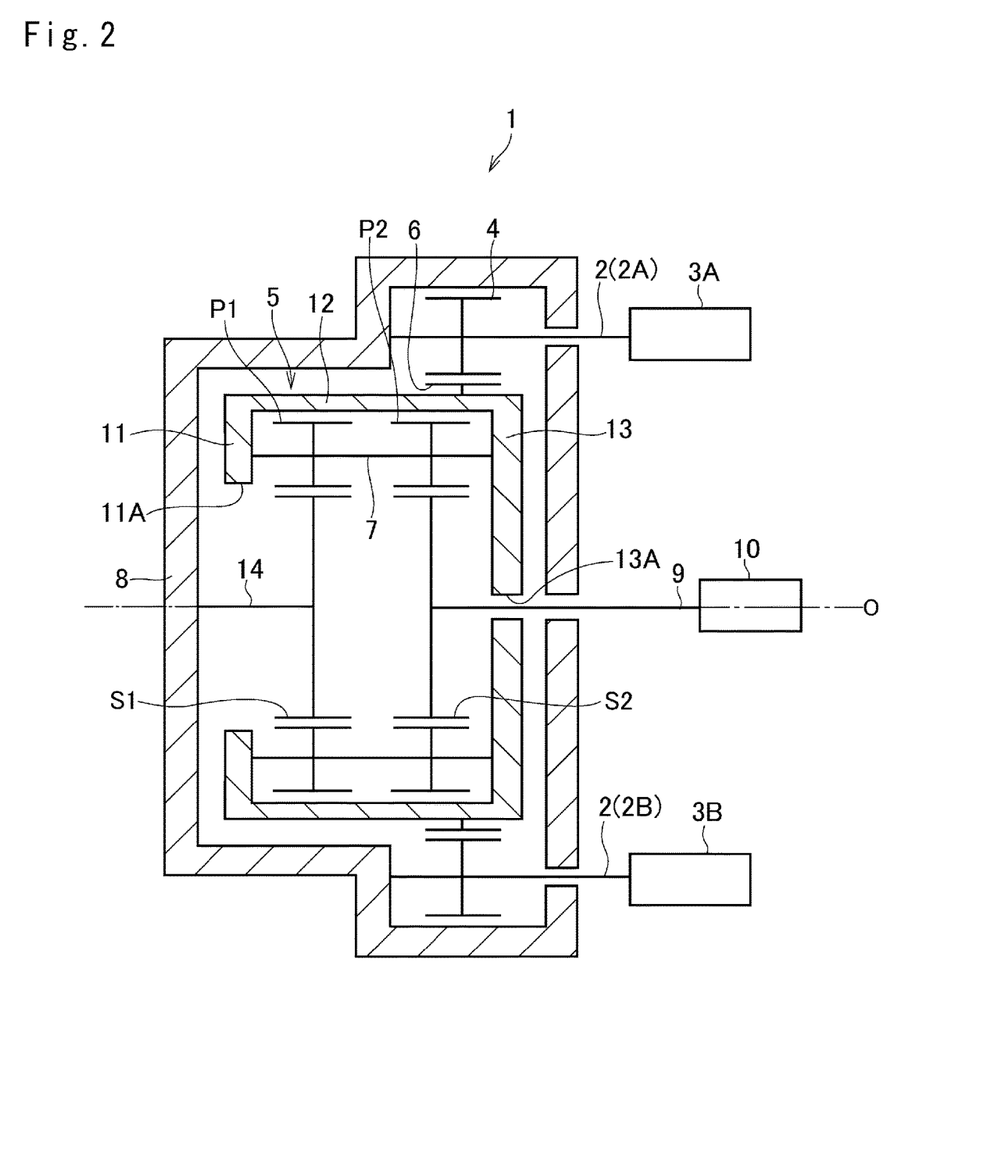
FIG. 2 is a cross-sectional view schematically showing a second embodiment of the geared transmission unit.

Turning to FIG. 2, there is shown the second embodiment of the geared transmission unit 1 according to the present disclosure. According to the second embodiment, the carrier 5 comprises an annular first carrier plate 11 formed on the first sin gear S1 side, a cylindrical portion 12 extending axially from an outer circumferential portion of the first carrier plate 11, and an annular second carrier plate 13 joined to the cylindrical portion 12 on an opposite side of the first carrier plate 11. A first sun gear shaft 14 of the first sun gear S1 as the fixed gear penetrates through a first through hole 11A of the first carrier plate 11, and the output shaft 9 coupled to the second sun gear S2 as the first transmission gear penetrates through a second through hole 13A of the second carrier plate 13. Thus, the carrier 5 has a closed structure except for the first through hole 11A of the first carrier plate 11 and the second through hole 13A of the second carrier plate 13. In other words, the carrier 5 has a truncated rectangular cross-section.

The external gear 6 is formed on the outer circumferential face of the carrier 5 in the vicinity of the second carrier plate 13 to be meshed with the drive gear 4 as the second transmission gear mounted on the first input shaft 2A and the second input shaft 2B respectively. According to the second embodiment, the first input shaft 2A and the second input shaft 2B are also arranged on the same side as the output shaft 9 across the output shaft 9. In other words, the first input shaft 2A, the second input shaft 2B, the output shaft 9 protrude from the geared transmission unit 1 in the same direction. The first input shaft 2A is coupled to the first actuator 3A as the input device, and the second input shaft 2B is coupled to the second actuator 3B as the input device. The external gear 6 is situated on radially outer side of second pinion gear P2, and the external gear 6 and the second pinion gear P2 overlap each other at least partially in a circumferential direction.

The first pinion shaft 7 extends parallel to the rotational center axis O. One end of the first pinion shaft 7 is attached to the first carrier plate 11, and the other end of the first pinion shaft 7 is attached to the second carrier plate 13.

In the second embodiment, not only the actuator for generating a drive torque but also the actuator for generating a brake torque may be adopted as the first actuator 3A and the second actuator 3B respectively. Instead, the actuator for generating a drive torque may be adopted as any one of the first actuator 3A and the second actuator 3B, and the actuator for generating a brake torque may be adopted as the other one of the first actuator 3A and the second actuator 3B. As described, the likes of a permanent magnet type synchronous motor or an induction motor, may be adopted as the actuator to generate a drive torque, and the likes of an electromagnetic brake and a regenerative brake may be adopted as the actuator to generate a brake torque. The remaining structures of the geared transmission unit 1 shown in FIG. 2 are identical to those of the geared transmission unit 1 shown in FIG. 1, and detailed explanation therefore will be omitted.

In the second embodiment, the output speed $N_{out}$ of the second sun gear S2 may also be calculated using the above-explained expression (1). As described, the teeth numbers of the first sun gear S1, the second sun gear S2, the first pinion gear P1, and the second pinion gear P2 are set in such a manner that an absolute value of the output speed $N_{out}$ of the second sun gear S2 is reduced smaller than "1". In addition, the teeth number ZP1 of the first pinion gear P1 may be smaller than the teeth number ZP2 of the second pinion gear P2. In the geared transmission unit 1 shown in FIG. 2, therefore, the output speed $N_{out}$ of the second sun gear S2 is reduced lower than the speed $N_{IN}$ of the carrier 5.

Here will be explained an action of the geared transmission unit 1 according to the second embodiment of the case in which the actuator for generating a drive torque is adopted as both of the first actuator 3A and the second actuator 3B. In this case, at least one of the first actuator 3A and the second actuator 3B generate(s) a drive torque to rotate the drive gear(s) 4. In this situation, since the external gear 6 is diametrically larger than the drive gear 4, the carrier 5 is rotated at a speed lower than the rotational speed of the drive gear 4. Consequently, the first pinion gear P1 revolves around the fixed first sun gear S1 while rotating due to the rotation of the carrier 5. In this situation, the second pinion gear P2 is rotated integrally with the first pinion gear P1 at the same speed in the same direction. Consequently, the second sun gear S2 meshing with the second pinion gear P2 and the output shaft 9 coupled to the second sun gear S2 are rotated by the rotation of the second pinion gear P2. Specifically, the second sun gear S2 and the output shaft 9 are rotated at a speed governed by the gear ratio between the second pinion gear P2 and the second sun gear S2, and the rotational speed and the revolving speed of the second pinion gear P2. Since the rotational speed of the output shaft 9 is reduced lower than the rotational speed of the carrier 5, the output torque(s) of at least one of the first actuator 3A and the second actuator 3B may be transmitted to the output shaft 9 while being multiplied. In addition, since the first actuator 3A and the second actuator 3B are also arranged in the geared transmission unit 1 according to the second embodiment, loads on each of the first actuator 3A and the second actuator 3B can be reduced. Therefore, the first actuator 3A and the second actuator 3B may also be downsized.

As described, in the geared transmission unit 1 according to the second embodiment, the actuator for generating a brake torque may also be adopted as the first actuator 3A and the second actuator 3B respectively to reduce the speed of the output member 10 or to stop the rotation of the output member 10. In this case, the rotational speed of the carrier 5 is increased higher than the output shaft 9 coupled to the second sun gear S2. Since the drive gear 4 meshing with the external gear 6 of the carrier 5 is diametrically smaller than the external gear 6, the rotational speed of the drive gear 4 is increased higher than the rotational speed of the carrier 5. That is, the torque of the drive gear 4 is reduced lower than the torque of the carrier 5. In addition, since the first actuator 3A and the second actuator 3B are also arranged in this case, loads on each of the first actuator 3A and the second actuator 3B can be reduced. Therefore, the first actuator 3A and the second actuator 3B may also be downsized.

As also described, in the geared transmission unit 1 according to the second embodiment, the actuator for generating a drive torque may be adopted as one of the first actuator 3A and the second actuator 3B, and the actuator for generating a brake torque may be adopted as the other one of the first actuator 3A and the second actuator 3B. In this case, the drive torque generated by one of the first actuator 3A and the second actuator 3B may be delivered to the output member 10 while being multiplied, and the torque of the output member 10 may be delivered to the other one of the first actuator 3A and the second actuator 3B while being reduced. In this case, smaller motors may also be adopted as the first actuator 3A and the second actuator 3B, and the geared transmission unit 1 according to the second embodiment may be provided with a drive motor and a brake motor. In addition, since the first input shaft 2A and the second input shaft 2B are arranged on the same side as the output shaft 9, lengths of those shafts may be reduced and hence flexibility of arrangement of the first actuator 3A and the second actuator 3B can be increased. For these reasons, the geared transmission unit 1 may be fitted easily into a vehicle. Furthermore, since the carrier 5 has a closed structure, strength of the carrier 5 may be enhanced to bear the load resulting from torque transmission.

Third Embodiment

Figure 3:
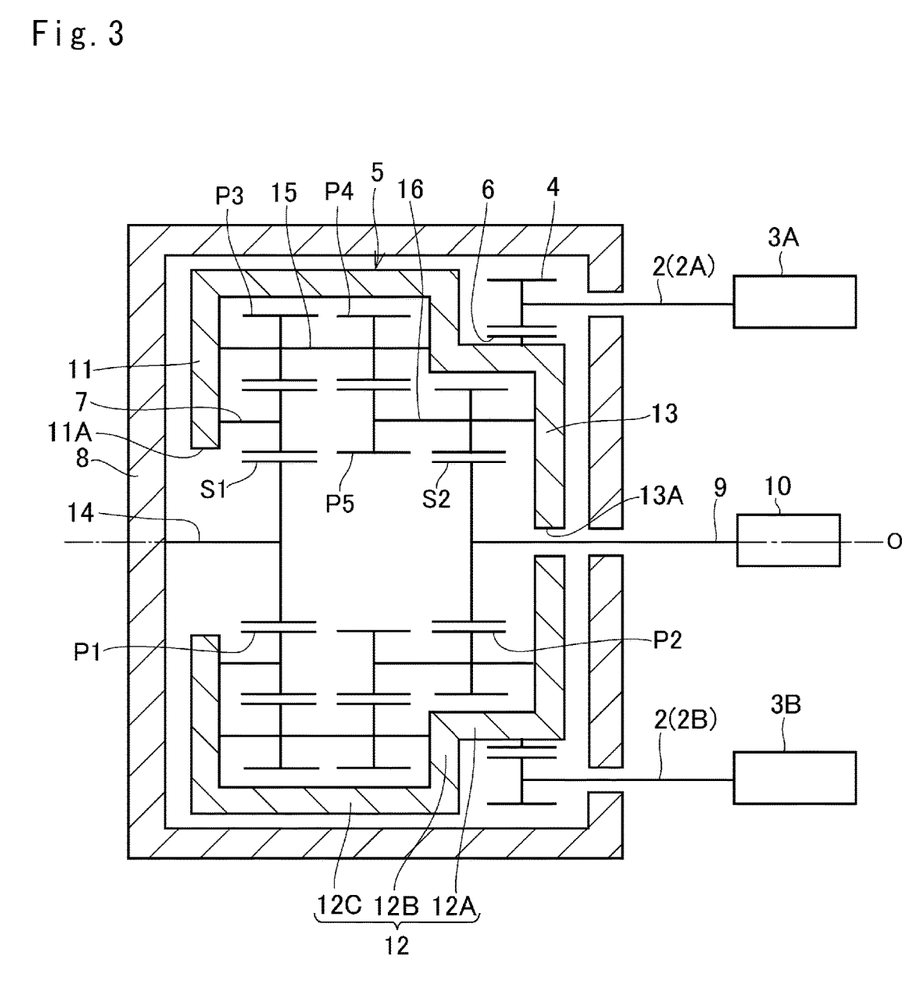
FIG. 3 is a cross-sectional view schematically showing a third embodiment of the geared transmission unit.

Turning to FIG. 3, there is shown the third embodiment of the geared transmission unit 1 according to the present disclosure. According to the third embodiment, the carrier 5 comprises the annular first carrier plate 11 formed on the first sun gear S1 side, the cylindrical portion 12 extending axially from the outer circumferential portion of the first carrier plate 11, and the annular second carrier plate 13 joined to the cylindrical portion 12 on an opposite side of the first carrier plate 11. The first sun gear shaft 14 of the first sun gear S1 penetrates through the first through hole 11A of the first carrier plate 11, and the output shaft 9 coupled to the second sun gear S2 penetrates through the second through hole 13A of the second carrier plate 13. The second sun gear S2 is meshed with the second pinion gear P2. Thus, the carrier 5 also has a closed structure except for the first through hole 11A of the first carrier plate 11 and the second through hole 13A of the second carrier plate 13.

The cylindrical portion 12 includes a diametrically smaller portion 12A, extending axially from the outer circumferential portion of the second carrier plate 13, a connecting portion 12B expanding radially outwardly from a leading end of the diametrically smaller portion 12A, and a diametrically larger portion 12C extending axially from an outer circumferential portion of the connecting portion 12B. That is, the cylindrical portion 12 has a stepped portion, and the diametrically smaller portion 12A is connected to the diametrically larger portion 12C through the connecting portion 12B. The first carrier plate 11 expands radially inwardly from a leading end of the diametrically larger portion 13C.

The external gear 6 is formed on an outer circumferential face of the diametrically smaller portion 12A of the carrier 5, and two drive gears 4 are meshed with the external gear 6. One of the drive gears 4 is coupled to the first input shaft 2A, and the other one of the drive gears 4 is coupled to the second input shaft 2B. According to the third embodiment, the first input shaft 2A and the second input shaft 2B are also arranged on the same side as the output shaft 9 across the output shaft 9. The first input shaft 2A is coupled to the first actuator 3A, and the second input shaft 2B is coupled to the second actuator 3B. The external gear 6 is situated on radially outer side of second pinion gear P2, and the external gear 6 and the second pinion gear P2 overlap each other at least partially in a circumferential direction.

In the carrier 5, five pinion gears P1, P2, P3, P4, and P5 as external gears are supported in a rotatable manner. Specifically, the first pinion shaft 7 extending in parallel with the rotational center axis O of the carrier 5 is attached to the first carrier plate 11, and the first pinion gear P1 is mounted on the first pinion shaft 7 in a rotatable manner while being meshed with the first sun gear S1.

The first pinion gear P1 is also meshed with the third pinion gear P3. The third pinion gear P3 is situated on radially outer side of the first pinion gear P1, and the first pinion gear P1 and the third pinion gear P3 overlap each other at least partially in the circumferential direction.

Specifically, the third pinion gear P3 is supported in a rotatable manner by the second pinion shaft 15 extending parallel to the first pinion shaft 7. One of end portions of the second pinion shaft 15 is attached to the first carrier plate 11, and the other end portion of the second pinion shaft 15 is attached to the connecting portion 12B. The fourth pinion gear P4 is also supported by the second pinion shaft 15 in such a manner as to rotate integrally with the third pinion gear P3, and the fifth pinion gear P5 is meshed with the fourth pinion gear P4.

The fifth pinion gear P5 is situated on radially outer side of the fourth pinion gear P4, and the fifth pinion gear P5 and the fourth pinion gear P4 overlap each other at least partially in the circumferential direction. The second pinion gear P2 and the fifth pinion gear P5 are supported in such a manner as to rotate integrally by a third pinion shaft 16 attached to the second carrier plate 13.

In the third embodiment, not only the actuator for generating a drive torque but also the actuator for generating a brake torque may be adopted as the first actuator 3A and the second actuator 3B respectively. Instead, the actuator for generating a drive torque may be adopted as any one of the first actuator 3A and the second actuator 3B, and the actuator for generating a brake torque may be adopted as the other one of the first actuator 3A and the second actuator 3B. As described, the likes of a permanent magnet type synchronous motor or an induction motor, may be adopted as the actuator to generate a drive torque, and the likes of an electromagnetic brake and a regenerative brake may be adopted as the actuator to generate a brake torque. The remaining structures of the geared transmission unit 1 shown in FIG. 3 are identical to those of the geared transmission unit 1 shown in FIG. 1, and detailed explanation therefore will be omitted.

Here will be explained an action of the geared transmission unit 1 according to the third embodiment of the case in which the actuator for generating a drive torque is adopted as both of the first actuator 3A and the second actuator 3B. In this case, at least one of the first actuator 3A and the second actuator 3B generate(s) a drive torque to rotate the drive gear(s) 4. In this situation, since the external gear 6 is diametrically larger than the drive gear 4, the carrier 5 is rotated at a speed lower than the rotational speed of the drive gear 4. Consequently, the first pinion gear P1 revolves around the fixed first sun gear S1 while rotating due to the rotation of the carrier 5. In this situation, the third pinion gear P3 is rotated integrally with the fourth pinion gear P4 at the same speed in the same direction. Consequently, the fifth pinion gear P5 is rotated by the rotation of the fourth pinion gear P4 together with the second pinion gear P2 at the same speed in the same direction. As a result, the second sun gear S2 and the output shaft 9 coupled to the second sun gear S2 are rotated by the rotation of the second pinion gear P2. Specifically, the second sun gear S2 and the output shaft 9 are rotated at a speed governed by the gear ratio between the second pinion gear P2 and the second sun gear S2, and the rotational speed and the revolving speed of the second pinion gear P2.

A speed ratio between the carrier 5 and the second sun gear S2 in the geared transmission unit 1 according to the third embodiment, that is, an output speed $N_{out}$ of the second sun gear S2 in the geared transmission unit 1 according to the third embodiment can be expressed by the following expression (2):

$$N_{out} = N_{IN} \cdot (1 - (ZS1/ZP3) \cdot (ZP4/ZP5) \cdot (ZP2/ZS2)) \quad (2)$$

where $N_{IN}$ is a speed of the carrier 5, ZS1 is the teeth number of the first sun gear S1, ZP2 is the teeth number of the second pinion gear P2, ZP3 is the teeth number of the third pinion gear P3, ZP4 is the teeth number of the fourth pinion gear P4, ZP5 is the teeth number of the fifth pinion gear P5, and ZS2 is the teeth number of the second sun gear S2.

For example, given that $N_{IN}$ is 1, ZS1 is 30, ZP2 is 30, ZP3 is 29, ZP4 is 30, ZP5 is 31, and ZS2 is 30, the output speed $N_{out}$ of the output shaft 9 calculated using the expression (2) is:

$$N_{out} = -0.001112.$$

In this case, when the carrier 5 is rotated by at least one of the actuators 3A and 3B, the second sun gear S2 is rotated 0.001112 times in an opposite direction to the carrier 5. That is, the input torque is multiplied to be outputted. Accordingly, the speed reducing ratio γ as an inverse of $N_{out}$ is −899.

Thus, in the geared transmission unit 1 according to the third embodiment, the output speed $N_{out}$ of the second sun gear S2 is reduced lower than the input speed $N_{IN}$ of the carrier 5. That is, the output torque(s) of at least one of the first actuator 3A and the second actuator 3B may be transmitted to the output shaft 9 while being multiplied. In addition, since the first actuator 3A and the second actuator 3B are also arranged in the geared transmission unit 1 according to the third embodiment, loads on each of the first actuator 3A and the second actuator 3B can be reduced. Therefore, the first actuator 3A and the second actuator 3B may also be downsized.

Here will be explained an action of the geared transmission unit 1 according to the third embodiment of the case in which the actuator for generating a brake torque is adopted as the first actuator 3A and the second actuator 3B respectively to reduce the speed of the output member 10 or to stop the rotation of the output member 10. In this case, the rotational speed of the carrier 5 is increased higher than the rotational speed of the output shaft 9 coupled to the second sun gear S2. In other words, the torque of the carrier 5 is reduced lower than the torque of the second sun gear S2. Since the drive gear 4 meshing with the external gear 6 of the carrier 5 is diametrically smaller than the external gear 6, the rotational speed of the drive gear 4 is further increased higher than the rotational speed of the carrier 5. That is, the torque of the drive gear 4 is reduced lower than the torque of the carrier 5. In addition, since the first actuator 3A and the second actuator 3B are also arranged in this case, loads on each of the first actuator 3A and the second actuator 3B can be reduced. Therefore, the first actuator 3A and the second actuator 3B may also be downsized.

Here will be explained an action of the geared transmission unit 1 according to the third embodiment of the case in which the actuator for generating a drive torque is adopted as one of the first actuator 3A and the second actuator 3B, and the actuator for generating a brake torque is adopted as the other one of the first actuator 3A and the second actuator 3B. In this case, the drive torque generated by one of the first actuator 3A and the second actuator 3B may be delivered to the output member 10 while being multiplied, and the torque of the output member 10 may be delivered to the other one of the first actuator 3A and the second actuator 3B while being reduced. In this case, smaller motors may also be adopted as the first actuator 3A and the second actuator 3B, and the geared transmission unit 1 according to the third embodiment may be provided with a drive motor and a brake motor. In addition, since the first input shaft 2A and the second input shaft 2B are arranged on the same side as the output shaft 9, lengths of those shafts may be reduced and hence flexibility of arrangement of the first actuator 3A and the second actuator 3B can be increased. For these reasons, the geared transmission unit 1 may be fitted easily into a vehicle. Furthermore, since the carrier 5 has a closed structure, strength of the carrier 5 may be enhanced to bear the load resulting from torque transmission.

Fourth Embodiment

Figure 4:
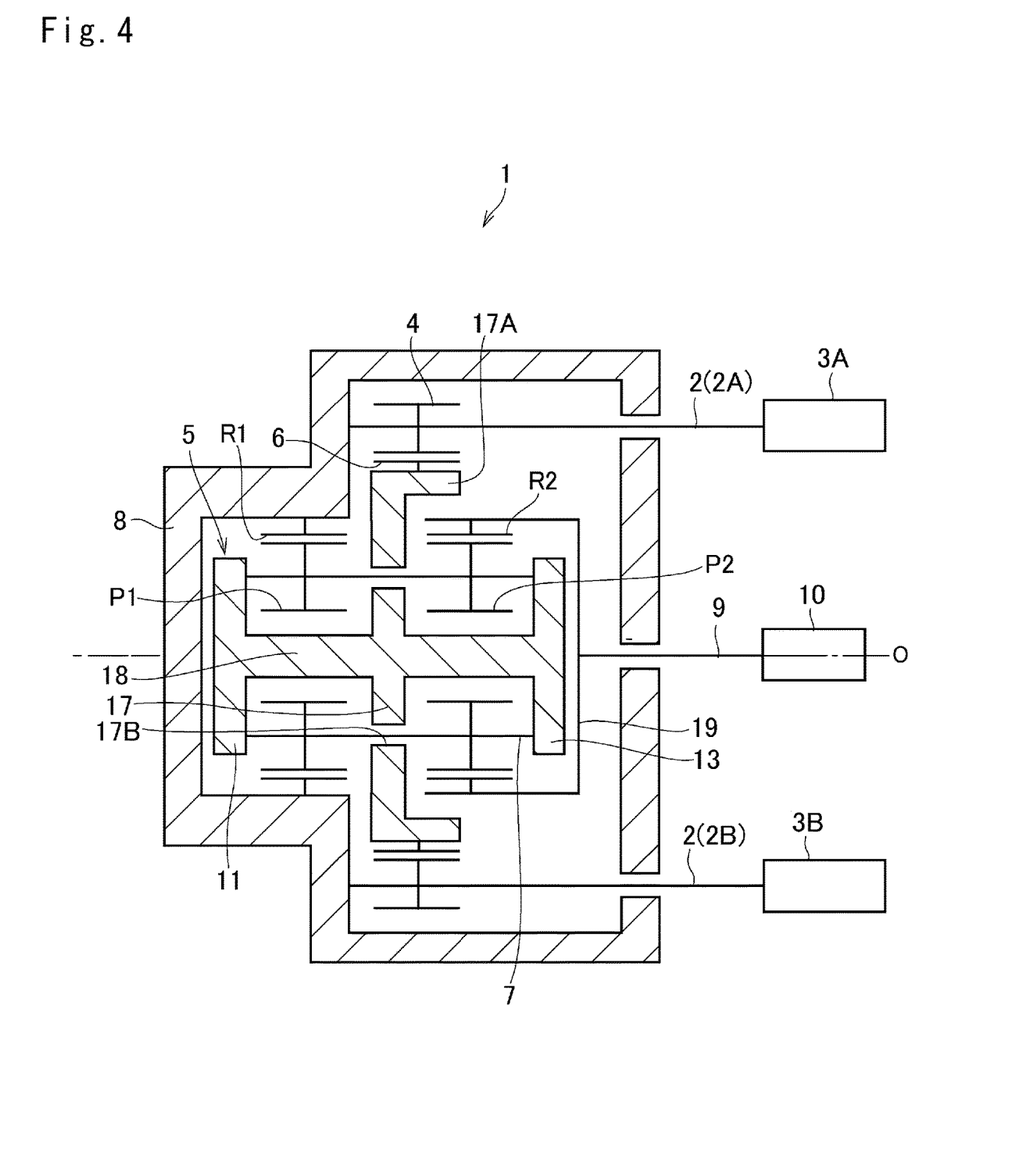
FIG. 4 is a cross-sectional view schematically showing a fourth embodiment of the geared transmission unit.

Turning to FIG. 4, there is shown the fourth embodiment of the geared transmission unit 1 according to the present disclosure. According to the fourth embodiment, the carrier 5 comprises a shaft portion 18 extending coaxially with the output shaft 9, the first carrier plate 11 formed on one end of the shaft portion 18, the second carrier plate 13 formed on the other end of the shaft portion 18, and a third carrier plate 17 formed between the first carrier plate 11 and the second carrier plate 13. The first carrier plate 11, the third carrier plate 17, and the second carrier plate 13 are formed on the shaft portion 18 at regular intervals. Both of the first carrier plate 11 and the second carrier plate 13 are annular plate members, and diameters of the first carrier plate 11 and the second carrier plate 13 are identical to each other. The third carrier plate 17 is diametrically larger than the first carrier plate 11 and the second carrier plate 13, and includes a cylindrical portion 17A extending axially from an outer circumferential portion of the third carrier plate 17.

The external gear 6 is formed on an outer circumferential face of the cylindrical portion 17A of the carrier 5, and two drive gears 4 are meshed with the external gear 6. One of the drive gears 4 is coupled to the first input shaft 2A, and the other one of the drive gears 4 is coupled to the second input shaft 2B. According to the fourth embodiment, the first input shaft 2A and the second input shaft 2B are also arranged on the same side as the output shaft 9 across the output shaft 9. The first input shaft 2A is also coupled to the first actuator 3A, and the second input shaft 2B is also coupled to the second actuator 3B.

The first pinion shaft 7 extends in the axial direction while penetrating through the third carrier plate 17. The first pinion gear P1 is mounted on one end of the first pinion shaft 7 in a rotatable manner, and the second pinion gear P2 is mounted on the other end of the first pinion shaft 7 in a rotatable manner. In other words, the first pinion gear P1 and the second pinion gear P2 are mounted on the first pinion shaft 7 across the third carrier plate 17, and the first pinion gear P1 and the second pinion gear P2 are rotated integrally.

A first ring gear R1 as an internal gear that is diametrically larger than the first pinion gear P1 meshes with the first pinion gear P1. The first ring gear R1 also serving as the fixed gear of the embodiments is arranged coaxially with the carrier 5 while being fixed to the casing 8. The second pinion gear P2 meshes with a second ring gear R2 also serving as the first transmission gear that is diametrically larger than the second pinion gear P2. Specifically, a cylindrical shaft 19 holding the second pinion gear P2 is coupled to the output shaft 9, and the second ring gear R2 is formed on an inner circumferential face of the cylindrical shaft 19 to be meshed with the second pinion gear P2. That is, the carrier 5 and the cylindrical shaft 19 are arranged coaxially, and one end of the output shaft 9 is coupled to a bottom face of the cylindrical shaft 19 and the other end of the output shaft 9 is coupled to the output member 10.

The second pinion gear P2 is situated on radially inner side of the external gear 6, and the second pinion gear P2 and the external gear 6 overlap each other at least partially in the circumferential direction.

In the fourth embodiment, not only the actuator for generating a drive torque but also the actuator for generating a brake torque may be adopted as the first actuator 3A and the second actuator 3B respectively. Instead, the actuator for generating a drive torque may be adopted as any one of the first actuator 3A and the second actuator 3B, and the actuator for generating a brake torque may be adopted as the other one of the first actuator 3A and the second actuator 3B. As described, the likes of a permanent magnet type synchronous motor or an induction motor, may be adopted as the actuator to generate a drive torque, and the likes of an electromagnetic brake and a regenerative brake may be adopted as the actuator to generate a brake torque.

Here will be explained an action of the geared transmission unit 1 according to the fourth embodiment of the case in which the actuator for generating a drive torque is adopted as both of the first actuator 3A and the second actuator 3B. In this case, at least one of the first actuator 3A and the second actuator 3B generate(s) a drive torque to rotate the drive gear(s) 4. In this situation, since the external gear 6 is diametrically larger than the drive gear 4, the carrier 5 is rotated at a speed lower than the rotational speed of the drive gear 4. Consequently, the first pinion shaft 7 is rotated by the rotation of the carrier 5 so that the first pinion gear P1 rotates and revolves within the fixed first ring gear R1. In this situation, the second pinion gear P2 is rotated integrally with the first pinion gear P1 at the same speed in the same direction. As a result, the second ring gear R2 meshing with the second pinion gear P2 and the output shaft 9 coupled to the second ring gear R2 are rotated by the rotation of the second pinion gear P2. Specifically, the second ring gear R2 and the output shaft 9 are rotated at a speed governed by the gear ratio between the second pinion gear P2 and the second ring gear R2, and the rotational speed and the revolving speed of the second pinion gear P2.

A speed ratio between the carrier 5 and the second ring gear R2 in the geared transmission unit 1 according to the fourth embodiment, that is, an output speed $N_{out}$ of the second ring gear R2 in the geared transmission unit 1 according to the fourth embodiment can be expressed by the following expression (3):

$$N_{out}=N_{IN}\cdot(1-(ZR1/ZP1)\cdot(ZP2/ZR2)) \qquad (3)$$

where $N_{IN}$ is a speed of the carrier 5, ZR1 is the teeth number of the first ring gear R1, ZP1 is the teeth number of the first pinion gear P1, ZP2 is the teeth number of the second pinion gear P2, and ZR2 is the teeth number of the second ring gear R2. Specifically, the teeth numbers of the first ring gear R1, the second ring gear R2, the first pinion gear P1, and the second pinion gear P2 are set in such a manner that an absolute value of the output speed $N_{out}$ of the second ring gear R2 is reduced smaller than "1". In addition, the teeth number ZP1 of the first pinion gear P1 may be smaller than the teeth number ZP2 of the second pinion gear P2.

Thus, in the geared transmission unit 1 according to the fourth embodiment, the output speed $N_{out}$ of the second ring gear R2 is reduced lower than the input speed $N_{IN}$ of the carrier 5. That is, the output torque(s) of at least one of the first actuator 3A and the second actuator 3B may be transmitted to the output shaft 9 while being multiplied. In addition, since the first actuator 3A and the second actuator 3B are also arranged in the geared transmission unit 1 according to the fourth embodiment, loads on each of the first actuator 3A and the second actuator 3B can be reduced. Therefore, the first actuator 3A and the second actuator 3B may also be downsized.

Here will be explained an action of the geared transmission unit 1 according to the fourth embodiment of the case in which the actuator for generating a brake torque is adopted as the first actuator 3A and the second actuator 3B respectively. In this case, the rotational speed of the carrier 5 is increased higher than the rotational speed of the second ring gear R2. Since the drive gear 4 meshing with the external gear 6 of the carrier 5 is diametrically smaller than the external gear 6, the rotational speed of the drive gear 4 is further increased higher than the rotational speed of the carrier 5. That is, the torque of the drive gear 4 is reduced lower than the torque of the carrier 5. In addition, since the first actuator 3A and the second actuator 3B are also arranged in this case, loads on each of the first actuator 3A and the second actuator 3B can be reduced. Therefore, the first actuator 3A and the second actuator 3B may also be downsized.

Here will be explained an action of the geared transmission unit 1 according to the fourth embodiment of the case in which the actuator for generating a drive torque is adopted as one of the first actuator 3A and the second actuator 3B, and the actuator for generating a brake torque is adopted as the other one of the first actuator 3A and the second actuator 3B. In this case, the drive torque generated by one of the first actuator 3A and the second actuator 3B may be delivered to the output member 10 while being multiplied, and the torque of the output member 10 may be delivered to the other one of the first actuator 3A and the second actuator 3B while being reduced. In this case, smaller motors may also be adopted as the first actuator 3A and the second actuator 3B, and the geared transmission unit 1 according to the fourth embodiment may be provided with a drive motor and a brake motor. In addition, since the first input shaft 2A and the second input shaft 2B are arranged on the same side as the output shaft 9, lengths of those shafts may be reduced and hence flexibility of arrangement of the first actuator 3A and the second actuator 3B can be increased. For these reasons, the geared transmission unit 1 may be fitted easily into a vehicle.

Fifth Embodiment

Figure 5:
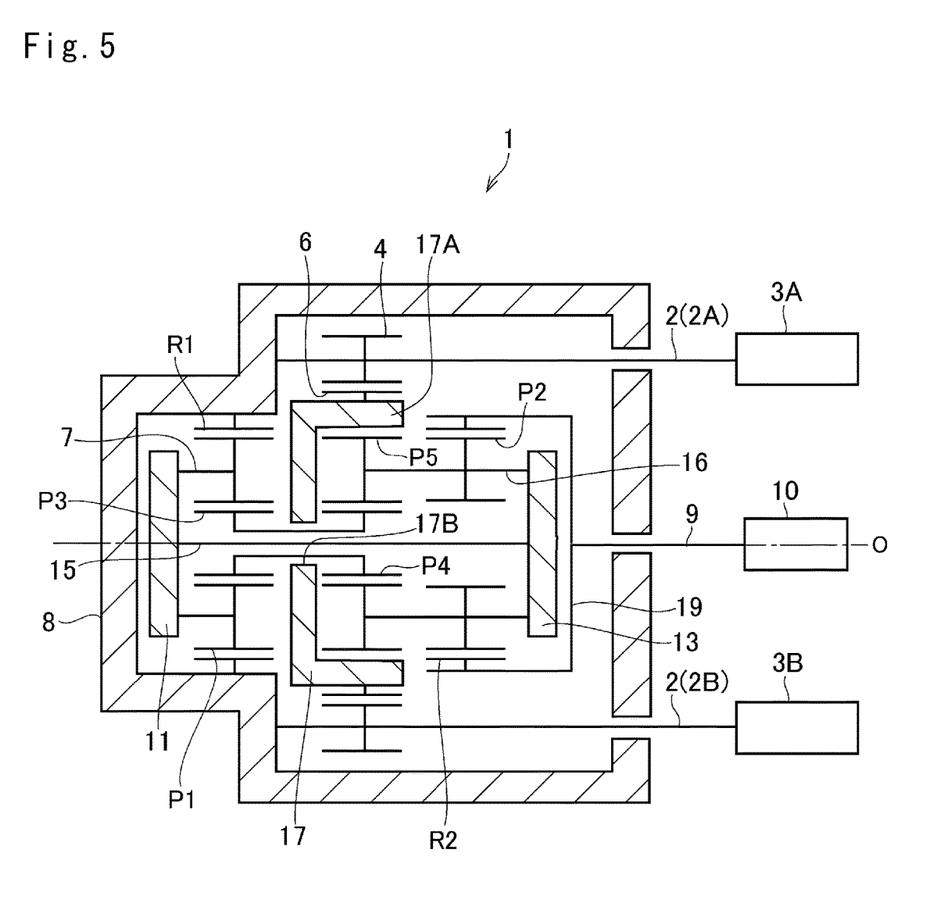
FIG. 5 is a cross-sectional view schematically showing a fifth embodiment of the geared transmission unit.

Turning to FIG. 5, there is shown the fifth embodiment of the geared transmission unit 1 according to the present disclosure. According to the fifth embodiment, the carrier 5 comprises the first carrier plate 11 situated on one of axial end in the casing 8, the second carrier plate 13 situated on the other axial end in the casing 8, and the third carrier plate 17 situated between the first carrier plate 11 and the second carrier plate 13. The first carrier plate 11, the third carrier plate 17, and the second carrier plate 13 are arranged in the casing 8 at regular intervals. Both of the first carrier plate 11 and the second carrier plate 13 are annular plate members, and diameters of the first carrier plate 11 and the second carrier plate 13 are identical to each other. The third carrier plate 17 is diametrically larger than the first carrier plate 11 and the second carrier plate 13, and includes the cylindrical portion 17A extending axially from the outer circumferential portion of the third carrier plate 17.

The external gear 6 is formed on the outer circumferential face of the cylindrical portion 17A of the carrier 5, and two drive gears 4 are meshed with the external gear 6. One of the drive gears 4 is coupled to the first input shaft 2A, and the other one of the drive gears 4 is coupled to the second input shaft 2B. According to the fifth embodiment, the first input shaft 2A and the second input shaft 2B are also arranged on the same side as the output shaft 9 across the output shaft 9. The first input shaft 2A is also coupled to the first actuator 3A, and the second input shaft 2B is also coupled to the second actuator 3B.

In the carrier 5, five pinion gears P1, P2, P3, P4, and P5 as external gears are supported in a rotatable manner. Specifically, the first pinion shaft 7 extending in parallel with the rotational center axis O of the carrier 5 is attached to the first carrier plate 11, and the first pinion gear P1 is mounted on the first pinion shaft 7 in a rotatable manner while being meshed with the first ring gear R1 fixed to the casing 8.

The first pinion gear P1 is also meshed with the third pinion gear P3. The third pinion gear P3 is supported in a rotatable manner by the second pinion shaft 15 extending parallel to the first pinion shaft 7 while penetrating through a third through hole 17B of the third carrier plate 17. One of end portions of the second pinion shaft 15 is attached to the first carrier plate 11, and the other end portion of the second pinion shaft 15 is attached to the second carrier plate 13. The fourth pinion gear P4 is also supported by the second pinion shaft 15 in such a manner as to rotate integrally with the third pinion gear P3. That is, the fourth pinion gear P4 and the third pinion gear P3 are mounted on the second pinion shaft 15 across the third carrier plate 17, and the fifth pinion gear P5 is meshed with the fourth pinion gear P4.

The second pinion gear P2 serving as the first transmission gear and the fifth pinion gear P5 are supported in such a manner as to rotate integrally by the third pinion shaft 16 attached to the second carrier plate 13. The remaining structures of the geared transmission unit 1 shown in FIG. 5 are identical to those of the geared transmission unit 1 shown in FIG. 1, and detailed explanation therefore will be omitted.

In the fifth embodiment, not only the actuator for generating a drive torque but also the actuator for generating a brake torque may be adopted as the first actuator 3A and the second actuator 3B respectively. Instead, the actuator for generating a drive torque may be adopted as any one of the first actuator 3A and the second actuator 3B, and the actuator for generating a brake torque may be adopted as the other one of the first actuator 3A and the second actuator 3B. As described, the likes of a permanent magnet type synchronous motor or an induction motor, may be adopted as the actuator to generate a drive torque, and the likes of an electromagnetic brake and a regenerative brake may be adopted as the actuator to generate a brake torque.

Here will be explained an action of the geared transmission unit 1 according to the fifth embodiment of the case in which the actuator for generating a drive torque is adopted as both of the first actuator 3A and the second actuator 3B. In this case, at least one of the first actuator 3A and the second actuator 3B generate(s) a drive torque to rotate the drive gear(s) 4. In this situation, since the external gear 6 is diametrically larger than the drive gear 4, the carrier 5 is rotated at a speed lower than the rotational speed of the drive gear 4. Consequently, the first pinion gear P1 revolves around the fixed first ring gear R1 while rotating due to the rotation of the carrier 5. In this situation, the third pinion gear P3 is rotated integrally with the fourth pinion gear P4 at the same speed in the same direction. Consequently, the fifth pinion gear P5 is rotated by the rotation of the fourth pinion gear P4 together with the second pinion gear P2 at the same speed in the same direction. As a result, the second ring gear R2 and the output shaft 9 coupled to the second ring gear R2 are rotated by the rotation of the second pinion gear P2. Specifically, the second ring gear R2 and the output shaft 9 are rotated at a speed governed by the gear ratio between the second pinion gear P2 and the second ring gear R2, and the rotational speed and the revolving speed of the second pinion gear P2.

A speed ratio between the carrier 5 and the second ring gear R2 in the geared transmission unit 1 according to the fifth embodiment, that is, an output speed $N_{out}$ of the second ring gear R2 in the geared transmission unit 1 according to the fifth embodiment can be expressed by the following expression (4):

$$N_{out}=N_{IN}\cdot(1-(ZR1/ZP3)\cdot(ZP4/ZP5)\cdot(ZP2/ZR2)) \quad (4)$$

where $N_{IN}$ is a speed of the carrier 5, ZR1 is the teeth number of the first ring gear R1, ZP2 is the teeth number of the second pinion gear P2, ZP3 is the teeth number of the third pinion gear P3, ZP4 is the teeth number of the fourth pinion gear P4, ZP5 is the teeth number of the fifth pinion gear P5, and ZR2 is the teeth number of the second ring gear R2.

For example, given that $N_{IN}$ is 1, ZR1 is 30, ZP2 is 30, ZP3 is 29, ZP4 is 30, ZP5 is 31, and ZR2 is 30, the output speed $N_{out}$ of the output shaft 9 calculated using the expression (4) is:

$$N_{out}=-0.001112.$$

In this case, when the carrier 5 is rotated by at least one of the actuators 3A and 3B, the second ring gear R2 is rotated 0.001112 times in an opposite direction to the carrier 5. That is, the input torque is multiplied to be outputted. Accordingly, the speed reducing ratio γ as an inverse of $N_{out}$ is −899.

Thus, in the geared transmission unit 1 according to the fifth embodiment, the output speed $N_{out}$ of the second ring gear R2 is reduced lower than the input speed $N_{IN}$ of the carrier 5. That is, the output torque(s) of at least one of the first actuator 3A and the second actuator 3B may be transmitted to the output shaft 9 while being multiplied. In addition, since the first actuator 3A and the second actuator 3B are also arranged in the geared transmission unit 1 according to the third embodiment, loads on each of the first actuator 3A and the second actuator 3B can be reduced. Therefore, the first actuator 3A and the second actuator 3B may also be downsized.

Here will be explained an action of the geared transmission unit 1 according to the fifth embodiment of the case in which the actuator for generating a brake torque is adopted as the first actuator 3A and the second actuator 3B respectively to reduce the speed of the output member 10 or to stop the rotation of the output member 10. In this case, the rotational speed of the carrier 5 is increased higher than the rotational speed of the output shaft 9 coupled to the second ring gear R2. Since the drive gear 4 meshing with the external gear 6 of the carrier 5 is diametrically smaller than the external gear 6, the rotational speed of the drive gear 4 is further increased higher than the rotational speed of the carrier 5. That is, the torque of the drive gear 4 is reduced lower than the torque of the carrier 5. In addition, since the first actuator 3A and the second actuator 3B are also arranged in this case, loads on each of the first actuator 3A and the second actuator 3B can be reduced. Therefore, the first actuator 3A and the second actuator 3B may also be downsized.

Here will be explained an action of the geared transmission unit 1 according to the fifth embodiment of the case in which the actuator for generating a drive torque is adopted as one of the first actuator 3A and the second actuator 3B, and the actuator for generating a brake torque is adopted as the other one of the first actuator 3A and the second actuator 3B. In this case, the drive torque generated by one of the first actuator 3A and the second actuator 3B may be delivered to the output member 10 while being multiplied, and the torque of the output member 10 may be delivered to the other one of the first actuator 3A and the second actuator 3B while being reduced. In this case, smaller motors may also be adopted as the first actuator 3A and the second actuator 3B, and the geared transmission unit 1 according to the fifth embodiment may be provided with a drive motor and a brake motor. In addition, since the first input shaft 2A and the second input shaft 2B are arranged on the same side as the output shaft 9, lengths of those shafts may be reduced and hence flexibility of arrangement of the first actuator 3A and the second actuator 3B can be increased. For these reasons, the geared transmission unit 1 may be fitted easily into a vehicle.

Sixth Embodiment

Figure 6:
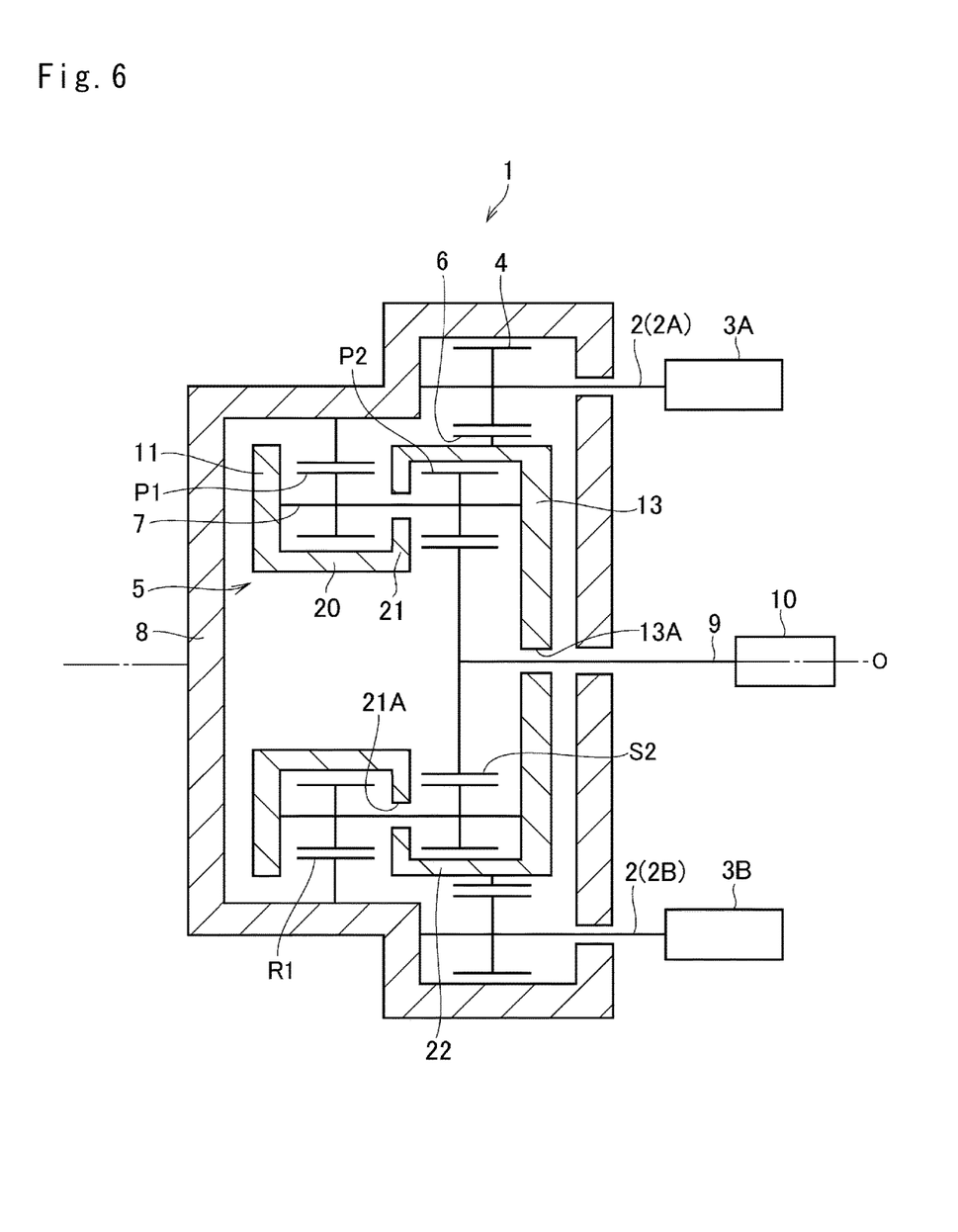
FIG. 6 is a cross-sectional view schematically showing a sixth embodiment of the geared transmission unit.

Turning to FIG. 6, there is shown the sixth embodiment of the geared transmission unit 1 according to the present disclosure. According to the sixth embodiment, the carrier 5 comprises: the first carrier plate 11 formed on the first sun gear S1 side; a diametrically smaller cylindrical portion 20 extending axially from an inner circumferential portion of the first carrier plate 11; a connecting portion 21 expanding radially outwardly from an axially inner end of the diametrically smaller cylindrical portion 20; a diametrically larger cylindrical portion 22 extending axially from an outer circumferential portion of the connecting portion 21; and the second carrier plate 13 formed within an axially outer end of the diametrically larger cylindrical portion 22.

The first pinion shaft 7 penetrates through a fourth through hole 21A of the connecting portion 21. One end of the first pinion shaft 7 is attached to the first carrier plate 11, and the other end of the first pinion shaft 7 is attached to the second carrier plate 13. The first pinion gear P1 is supported in a rotatable manner by the first pinion shaft 7 between the first carrier plate 11 and the connecting portion 21, and the first ring gear R1 that is diametrically larger than the first pinion gear P1 and fixed to the inner face of the casing 8 is meshed with the first pinion gear P1.

The second pinion gear P2 is also supported by the first pinion shaft 7 between the connecting portion 21 and the second carrier plate 13 to be rotated integrally with the first pinion gear P1. The output shaft 9 coupled to the second sun gear S2 serving as the first transmission gear penetrates through the second through hole 13A of the second carrier plate 13.

The external gear 6 is formed on an outer circumferential face of the diametrically larger cylindrical portion 22 of the carrier 5, and two drive gears 4 are meshed with the external gear 6. One of the drive gears 4 is coupled to the first input shaft 2A, and the other one of the drive gears 4 is coupled to the second input shaft 2B. According to the sixth embodiment, the first input shaft 2A and the second input shaft 2B are also arranged on the same side as the output shaft 9 across the output shaft 9. The first input shaft 2A is also coupled to the first actuator 3A, and the second input shaft 2B is also coupled to the second actuator 3B. The second pinion gear P2 is situated on radially inner side of the external gear 6, and the second pinion gear P2 and the external gear 6 overlap each other at least partially in the circumferential direction.

In the sixth embodiment, not only the actuator for generating a drive torque but also the actuator for generating a brake torque may be adopted as the first actuator 3A and the second actuator 3B respectively. Instead, the actuator for generating a drive torque may be adopted as any one of the first actuator 3A and the second actuator 3B, and the actuator for generating a brake torque may be adopted as the other one of the first actuator 3A and the second actuator 3B. As described, the likes of a permanent magnet type synchronous motor or an induction motor, may be adopted as the actuator to generate a drive torque, and the likes of an electromagnetic brake and a regenerative brake may be adopted as the actuator to generate a brake torque. The remaining structures of the geared transmission unit 1 shown in FIG. 6 are identical to those of the geared transmission unit 1 shown in FIG. 1, and detailed explanation therefore will be omitted.

A speed ratio between the carrier 5 and the second sun gear S2 in the geared transmission unit 1 according to the sixth embodiment, that is, an output speed $N_{out}$ of the second sun gear S2 in the geared transmission unit 1 according to the sixth embodiment can be expressed by the following expression (5):

$$N_{out} = N_{IN} \cdot (1 - (ZR1/ZP1) \cdot (ZP2/ZS2)) \quad (5)$$

where $N_{IN}$ is a speed of the carrier 5, ZR1 is the teeth number of the first ring gear R1, ZP1 is the teeth number of the first pinion gear P1, ZP2 is the teeth number of the second pinion gear P2, and ZS2 is the teeth number of the second sun gear S2. Specifically, the teeth numbers of the first ring gear R1, the second sun gear S2, the first pinion gear P1, and the second pinion gear P2 are set in such a manner that an absolute value of the output speed $N_{out}$ of the second sun gear S2 is reduced smaller than "1". In addition, the teeth number ZP1 of the first pinion gear P1 may be smaller than the teeth number ZP2 of the second pinion gear P2. In the geared transmission unit 1 according to the sixth embodiment, therefore, the output speed $N_{out}$ of the second sun gear S2 is reduced lower than the input speed $N_{IN}$ of the carrier 5.

Here will be explained an action of the geared transmission unit 1 according to the sixth embodiment of the case in which the actuator for generating a drive torque is adopted as both of the first actuator 3A and the second actuator 3B. In this case, at least one of the first actuator 3A and the second actuator 3B generate(s) a drive torque to rotate the drive gear(s) 4. In this situation, since the external gear 6 is diametrically larger than the drive gear 4, the carrier 5 is rotated at a speed lower than the rotational speed of the drive gear 4. Consequently, the first pinion gear P1 revolves around the fixed first ring gear R1 while rotating due to the rotation of the carrier 5. In this situation, the second pinion gear P2 is rotated integrally with the first pinion gear P1 at the same speed in the same direction. As a result, the second sun gear S2 and the output shaft 9 coupled to the second sun gear S2 are rotated by the rotation of the second pinion gear P2. Specifically, the second sun gear S2 and the output shaft 9 are rotated at a speed governed by the gear ratio between the second pinion gear P2 and the second sun gear S2, and the rotational speed and the revolving speed of the second pinion gear P2. That is, the output torques of the first actuator 3A and the second actuator 3B are transmitted to the output shaft 9 while being multiplied. In addition, since the first actuator 3A and the second actuator 3B are also arranged in the geared transmission unit 1, loads on each of the first actuator 3A and the second actuator 3B can be reduced. Therefore, the first actuator 3A and the second actuator 3B may also be downsized.

Here will be explained an action of the geared transmission unit 1 according to the sixth embodiment of the case in which the actuator for generating a brake torque is adopted as the first actuator 3A and the second actuator 3B respectively to reduce the speed of the output member 10 or to stop the rotation of the output member 10. In this case, the rotational speed of the carrier 5 is increased higher than the rotational speed of the output shaft 9 coupled to the second sun gear S2. Since the drive gear 4 meshing with the external gear 6 of the carrier 5 is diametrically smaller than the external gear 6, the rotational speed of the drive gear 4 is further increased higher than the rotational speed of the carrier 5. That is, the torque of the drive gear 4 is reduced lower than the torque of the carrier 5. In addition, since the first actuator 3A and the second actuator 3B are also arranged in this case, loads on each of the first actuator 3A and the second actuator 3B can be reduced. Therefore, the first actuator 3A and the second actuator 3B may also be downsized.

Here will be explained an action of the geared transmission unit 1 according to the sixth embodiment of the case in which the actuator for generating a drive torque is adopted as one of the first actuator 3A and the second actuator 3B, and the actuator for generating a brake torque is adopted as the other one of the first actuator 3A and the second actuator 3B. In this case, the drive torque generated by one of the first actuator 3A and the second actuator 3B may be delivered to the output member 10 while being multiplied, and the torque of the output member 10 may be delivered to the other one of the first actuator 3A and the second actuator 3B while being reduced. In this case, smaller motors may also be adopted as the first actuator 3A and the second actuator 3B, and the geared transmission unit 1 according to the sixth embodiment may be provided with a drive motor and a brake motor. In addition, since the first input shaft 2A and the second input shaft 2B are arranged on the same side as the output shaft 9, lengths of those shafts may be reduced and hence flexibility of arrangement of the first actuator 3A and the second actuator 3B can be increased. For these reasons, the geared transmission unit 1 may be fitted easily into a vehicle.

Although the above exemplary embodiments of the present disclosure have been described, it will be understood by those skilled in the art that the present disclosure should not be limited to the described exemplary embodiments, and various changes and modifications can be made within the scope of the present disclosure. For example, the geared transmission unit 1 may be modified to serve as a speed increasing device. In this case, the output shaft 9 is coupled to the drive gear 4 or the carrier 5, and the input shaft 2 is coupled to the second sun gear S2 or the second ring gear R2. In the geared transmission unit 1 thus modified, a rotational speed of the output shaft 9 is increased higher than a rotational speed of the input shaft 2.

What is claimed is:

1. A geared transmission unit that transmits torque through a plurality of gears, comprising:
    at least one pair of pinion gears having different teeth numbers that are disposed coaxially to rotate integrally;
    a carrier that rotates while supporting the pair of pinion gears in such a manner that the pinion gears are rotated and revolved;
    a fixed gear that is fixed to a predetermined stationary member while being meshed with a first pinion gear of the pair of pinion gears;
    a first transmission gear that is arranged on an inner circumferential side of the carrier and coaxially with the carrier while being meshed with a second pinion gear of the pair of pinion gears;
    an external gear that is formed on an outer circumferential face of the carrier; and
    a plurality of second transmission gears respectively meshing with the external gear.

2. The geared transmission unit as claimed in claim 1, wherein the first transmission gear and the second transmission gear are arranged in such a manner that rotational center axes of the first transmission gear and the second transmission gear extend parallel to a rotational center axis of the carrier,
    the geared transmission unit further comprises a driven member coupled to the first transmission gear, and a plurality of actuators individually coupled to the second transmission gears, and
    the driven member and the actuators are arranged on the same side of the geared transmission unit in an axial direction.

3. The geared transmission unit as claimed in claim 2, wherein the driven member includes an output member to which a torque is delivered from the first transmission gear, and
    the actuator includes a motor that applies a torque to the second transmission gear.

4. The geared transmission unit as claimed in claim 2, wherein the fixed gear includes a sun gear arranged on an inner circumferential side of the first pinion gear.

5. The geared transmission unit as claimed in claim 2, wherein the fixed gear includes a ring gear arranged on an outer circumferential side of the first pinion gear.

6. The geared transmission unit as claimed in claim 2, wherein the teeth number of the first pinion gear is smaller than the teeth number of the second pinion gear.

7. The geared transmission unit as claimed in claim 6, wherein the fixed gear includes a sun gear arranged on an inner circumferential side of the first pinion gear.

8. The geared transmission unit as claimed in claim 6, wherein the fixed gear includes a ring gear arranged on an outer circumferential side of the first pinion gear.

9. The geared transmission unit as claimed in claim 1, wherein the teeth number of the first pinion gear is smaller than the teeth number of the second pinion gear.

10. The geared transmission unit as claimed in claim 9, wherein the fixed gear includes a sun gear arranged on an inner circumferential side of the first pinion gear.

11. The geared transmission unit as claimed in claim 9, wherein the fixed gear includes a ring gear arranged on an outer circumferential side of the first pinion gear.

12. The geared transmission unit as claimed in claim 9,
wherein the driven member includes an output member to which a torque is delivered from the first transmission gear, and
the actuator includes a motor that applies a torque to the second transmission gear.

13. The geared transmission unit as claimed in claim 1, wherein the fixed gear includes a sun gear arranged on an inner circumferential side of the first pinion gear.

14. The geared transmission unit as claimed in claim 13,
wherein the driven member includes an output member to which a torque is delivered from the first transmission gear, and
the actuator includes a motor that applies a torque to the second transmission gear.

15. The geared transmission unit as claimed in claim 1, wherein the fixed gear includes a ring gear arranged on an outer circumferential side of the first pinion gear.

16. The geared transmission unit as claimed in claim 15,
wherein the driven member includes an output member to which a torque is delivered from the first transmission gear, and
the actuator includes a motor that applies a torque to the second transmission gear.

* * * * *